Feb. 2, 1932.                    E. KERN                  1,843,133
   ARRANGEMENT FOR PREVENTING VOLTAGE INCREASE WITH COMPLETE NO-LOAD
       OPERATION OF MERCURY VAPOR DIRECT CURRENT RECTIFIERS
                       Filed Oct. 22, 1928
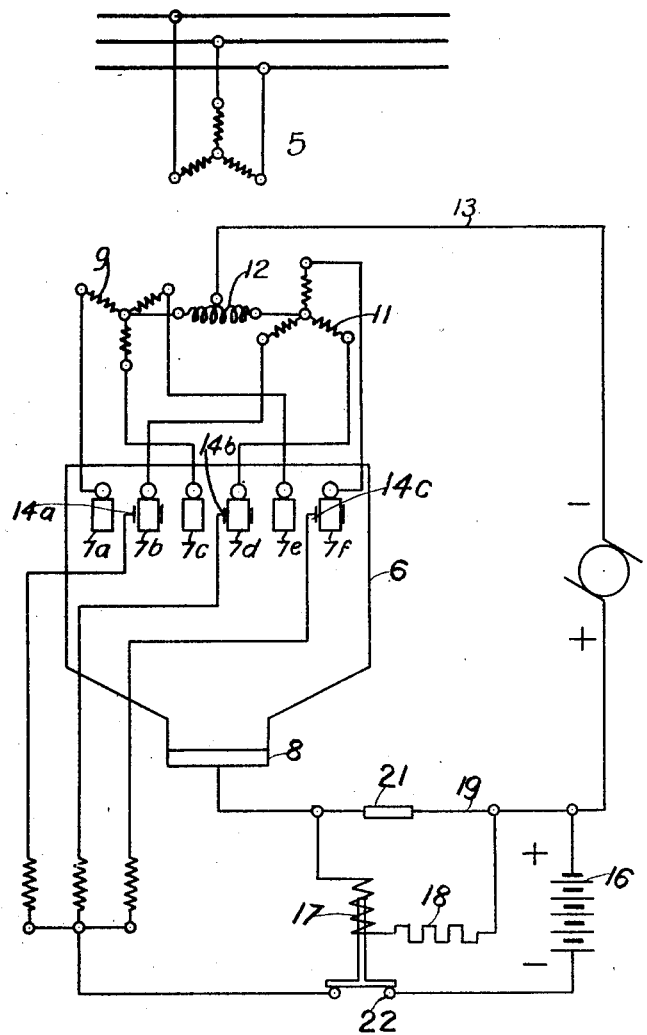
Inventor
Erwin Kern
By Alfred H. Dyson
Attorney Patented Feb. 2, 1932

1,843,133

UNITED STATES PATENT OFFICE

ERWIN KERN, OF WETTINGEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ARRANGEMENT FOR PREVENTING VOLTAGE INCREASE WITH COMPLETE NO-LOAD OPERATION OF MERCURY VAPOR DIRECT CURRENT RECTIFIERS

Application filed October 22, 1928, Serial No. 314,139, and in Germany October 21, 1927.

This invention relates to mercury vapor electric current rectifying systems and, particularly, to means for preventing voltage increases therein during periods of their no-load operation.

The use of auto-transformers or double wound reactance coils in electric current rectifying systems is well known to the art. The objects, in using such coils, are to obtain more efficient use of the supply transformer, to permit use of a smaller transformer and to allow closer regulation of the voltage supplied to the rectifier.

Rectifying systems employing such coils show a voltage decrease in the rectifier for output current values varying from zero to the critical value below which the arc through the rectifier will be extinguished. At critical current the voltage decrease amounts to about 14%. A further, but comparatively negligible, voltage decrease (about 4%) occurs as the output current or load values approaches the maximum. Such voltage decreases are, in some cases, very harmful to apparatus supplied with current from the rectifier.

The voltage input of the rectifier at maximum current output increases very slightly up to the critical current value and corresponds to a frequency of a decreased number of phases, while a current outputs below the critical current value the voltage input increases very rapidly and corresponds to the frequency of the total number of phases. It will thus be seen that voltage increase below the critical value may be prevented by decreasing the number of operative phases.

It is therefore among the objects of the invention to prevent increase of voltage in a rectifier at zero current operation thereof.

A further object of the invention is to prevent the voltage increase above described by making a portion of the phases of the rectifier supplying transformer inoperative at the critical rectifier current so that voltage increases cannot occur below the critical current value.

Another object of the invention is to provide control lattices for the anodes of the rectifier, which lattices are controlled from the several phases of the rectifier supplying transformer in dependence on the loading of the rectifier.

A further object of the invention is to connect the control lattices, in dependence on the loading, to a minus voltage which is supplied from an accompanying direct current source.

Another object of the invention is to provide relay means for connecting the control lattices to an auxiliary source of direct current in dependence on the critical current value of the rectifier.

Further objects and advantages will appear hereinafter in the following description and the drawing accompanying and forming a portion of this specification.

In the drawing:

The figure is a schematic diagram of the invention applied to a six phase system.

Referring more particularly to the drawing by reference characters, 5 indicates the primary winding of a rectifier supplying transformer. A rectifier 6 of any well known construction having the anodes $7_a$, $7_b$, $7_c$, etc., and the cathode 8 is supplied from the secondary windings 9 and 11 of the rectifier supplying transformer. The secondaries 9 and 11 are connected in star, and an absorption reactance coil 12 is connected between the two secondary windings at their neutral or star points. The transformer side 13 of the direct current system is connected to a central point of the absorption reactance coil 12.

The anodes $7_b$, $7_d$, $7_f$, are provided with control lattices $14_a$, $14_b$, and $14_c$, said control lattices are supplied with a negative voltage from any suitable source of direct current such as a battery 16. The battery 16 is connected on the positive side with the line 19 forming the cathode side of the direct current system. A relay 17, in series with a resistance 18, is connected in parallel with the cathode line 19. A shunt 21 is inserted into the line 19, between the terminals of the relay circuit.

Decrease of the current in the rectifier armature of the relay 17 causes the armature to bridge a contact 22 thereby connecting the control current circuit with the anode lattices 14$_a$, 14$_b$, and 14$_c$. When the rectifier begins to operate, the relay 17 is energized and the contacts 22 are opened, thereby opening the leads of the control current circuit to the anode lattices in such manner that all of the anodes are arranged for six phase operation as soon as the rectifier is completely loaded. As soon as the load on the rectifier goes below the critical value, the relay 17 is de-energized and the armature thereof drops to close the contacts 22. The control current circuit for the anode lattices is closed, by dropping of the relay armature, and the anodes provided with the lattices become inoperative because of connection to the minus voltage of the battery. The rectifier then operates with only three anodes until, upon increasing the load on the rectifier, the relay 17 is again sufficiently energized to raise the armature and break the control current circuit.

In this arrangement the relay 17 must be proportioned to the size of the direct current and must operate at approximately one one-hundredths of this current.

It will be understood that the relay 17 may be replaced by a step-by-step relay having varying degrees of sensitivity so that the operation takes place in steps rather than at once.

It will be understood by those skilled in the art that the invention may be utilized with systems having any number of phases other than the six-phase system shown. For example, when a four-phase system is used, two of the four anodes, required in the rectifier, will be provided with lattices which will make the accompanying anodes inoperative upon increase of the load upon the rectifier. The operation of a four-phase system will be exactly similar to the operation of the six-phase system described. The arrangement is further useful for rectifiers of any phase number as will be readily apparent from the above description of a system having four phases rather than the six phases described.

Although I have illustrated one embodiment of my invention, it will be apparent to those skilled in the art that various modifications and changes may be made therein without departing from the spirit thereof or from the scope of the appended claims.

What I claim is:

1. In an electric current rectifying system including an electric current rectifier, a supply polyphase transformer primary winding, transformer secondary windings connected to the anodes of said rectifier, an auto-transformer connected between the neutral points of said secondary windings, and means for making a portion of the phases of the supply transformer inoperative when the rectifier current goes below the critical value.

2. In an electric current rectifying system including an electric current rectifier, a supply polyphase transformer primary winding, secondary transformer windings connected to the anodes of said rectifier, a reactance coil connected to the neutral points of said secondary windings, anode control lattices for a portion of the anodes of said rectifier, a source of direct current, and means for supplying said lattices from said direct current source when the rectifier current goes below the critical value.

3. In an electric current rectifying system including an electric current rectifier, a rectifier supplying polyphase transformer primary windings, said primary windings being star connected, transformer secondary windings connected with the anodes of said rectifier, said secondary windings being star connected, an auto-transformer connecting the neutral point of said secondary windings, anode control lattices for a portion of the anodes of said rectifier, a source of direct current, and means for supplying said lattices from said direct current source when the rectifier current goes below the critical value.

4. In an electric current rectifying system including an electric current rectifier, a supply polyphase transformer primary winding, secondary transformer windings connected with the anodes of said rectifier, said secondary windings being star connected, a reactance coil connected between the star points of said secondary windings, anode control lattices for the portion of the anodes of said rectifier, a source of direct current, and means for supplying said lattices from said direct current source in dependence on the loading of said rectifier.

5. In an electric current rectifying system including an electric current rectifier, a rectifier supplying polyphase transformer primary winding, transformer secondary windings connected with the anodes of said rectifier, a reactance coil connecting the neutral points of said secondary windings, anode control lattices for alternate anodes of said rectifier, a source of direct current, and means for supplying said lattices from said direct current source when the rectifier current goes below the critical value.

6. In an electric current rectifying system including an electric current rectifier, a rectifier supplying polyphase transformer primary winding secondary transformer windings connected to said anodes of said rectifier, an auto-transformer connecting the neutral points of said secondary windings, anode control lattices for a portion of the anodes of said rectifier, a source of direct current, and relay means for connecting said lattices with said direct current source when the rectifier current goes below the critical value.

7. In an electric current rectifying system including an electric current rectifier, a supply polyphase transformer, secondary transformer windings connected to the anodes of said rectifier, a reactance coil connected to said secondary windings, anode control lattices for a portion of the anodes of said rectifier, a source of direct current, a relay connected with said direct current source, and a resistance in series with said relay for connecting said direct current source with said anode control lattices in dependence on the critical current value of said rectifier.

8. In an electric current rectifying system comprising a rectifier having a cathode and a plurality of anodes, a transformer comprising a plurality of star-connected windings divided into groups, each said winding being connected to one of said anodes to supply working current thereto, a work circuit supplied with current by said rectifier, an auto-transformer connected between the neutral points of each of said groups of said windings and having a midtap connected to said work circuit, and means for rendering certain of said anodes inoperative when the current in the said work circuit is reduced below a predetermined value.

In testimony whereof I have hereunto subscribed my name this 25th day of September A. D. 1928.

ERWIN KERN.